United States Patent
Hill (10) Patent No.: US 11,486,430 B2
(45) Date of Patent: Nov. 1, 2022

(54) RADIALLY EXPANDING POST EXTENDER

(71) Applicant: THE HILLMAN GROUP, INC., Cincinnati, OH (US)

(72) Inventor: Ian A. Hill, Plano, TX (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 0 days.

(21) Appl. No.: 16/400,310

(22) Filed: May 1, 2019

(65) Prior Publication Data

US 2019/0257335 A1 Aug. 22, 2019

Related U.S. Application Data

(63) Continuation of application No. 15/791,944, filed on Oct. 24, 2017, now Pat. No. 10,428,849.

(51) Int. Cl.
| | |
|---|---|
| *F16B 7/04* | (2006.01) |
| *E04H 17/20* | (2006.01) |
| *E06B 11/02* | (2006.01) |
| *F16B 7/18* | (2006.01) |
| *F16B 12/40* | (2006.01) |
| *F16B 13/08* | (2006.01) |
| *F16B 7/02* | (2006.01) |

(52) U.S. Cl.
CPC ........... *F16B 7/0413* (2013.01); *E04H 17/20* (2013.01); *E06B 11/02* (2013.01); *F16B 7/025* (2013.01); *F16B 7/182* (2013.01); *F16B 12/40* (2013.01); *F16B 13/0891* (2013.01)

(58) Field of Classification Search
CPC .... F16B 7/0413; F16B 7/025; F16B 13/0891; F16B 12/40; F16B 7/182; E06B 11/02; E04H 17/20; E04H 17/1417; E04H 17/22; E04H 2017/146; E04H 2017/1473
See application file for complete search history.

(56) References Cited

U.S. PATENT DOCUMENTS

| 2,308,542 A | 12/1941 | Raybould | |
|---|---|---|---|
| 2,850,308 A | 1/1956 | Le Febvre et al. | |
| 2,918,840 A * | 12/1959 | Roesler | E21D 21/008 411/33 |
| 4,037,384 A * | 7/1977 | Molyneux | E02D 27/42 52/698 |
| 4,295,760 A * | 10/1981 | Warner | E21D 21/008 405/259.1 |
| 4,630,944 A | 12/1986 | Moehr | |

(Continued)

FOREIGN PATENT DOCUMENTS

| JP | 2011-014877 A | | 1/2011 | |
|---|---|---|---|---|
| JP | 2011014877 A | * | 1/2011 | ............ F24S 25/636 |

*Primary Examiner* — Brian D Mattei
*Assistant Examiner* — Omar F Hijaz
(74) *Attorney, Agent, or Firm* — Thompson Hine LLP (57) ABSTRACT

A post coupler expands laterally. The post coupler includes a first member that is hollow and has a first slanted face. A second member is also hollow and has a second slanted face that is abutted with the first slanted face. A rod extends through the first and second members; the rod has a head that is disposed at a head end and threads disposed at a thread end. A nut is engaged with the threads, and rotating the nut causes the first member to extend in a first lateral direction and causes the second cylindrical member to extend in a second lateral direction opposite the first lateral direction.

22 Claims, 7 Drawing Sheets

(56) References Cited

U.S. PATENT DOCUMENTS

| | | | | |
|---|---|---|---|---|
| 4,824,303 | A | * | 4/1989 | Dinger .................. H05K 7/1404 |
| | | | | 411/80 |
| 4,955,742 | A | | 9/1990 | Marks |
| 5,232,304 | A | * | 8/1993 | Huang ..................... F16B 7/025 |
| | | | | 403/374.4 |
| 5,915,900 | A | * | 6/1999 | Boltz .................... B60P 7/0807 |
| | | | | 410/106 |
| 6,332,657 | B1 | | 12/2001 | Fischer |
| 7,197,806 | B2 | * | 4/2007 | Boudreaux ............... F16B 5/02 |
| | | | | 29/434 |
| 7,730,675 | B2 | | 6/2010 | Hill |
| 8,696,229 | B2 | * | 4/2014 | Tran ..................... F16B 7/1463 |
| | | | | 296/193.11 |
| 9,115,506 | B2 | | 8/2015 | Hill |
| 2008/0138152 | A1 | * | 6/2008 | Carnevali ............. F16B 7/1418 |
| | | | | 403/376 |
| 2009/0103976 | A1 | | 4/2009 | Chiang |
| 2013/0075436 | A1 | | 3/2013 | Martin |
| 2015/0102077 | A1 | | 4/2015 | Martin |

\* cited by examiner

RADIALLY EXPANDING POST EXTENDER

CROSS-REFERENCE TO RELATED APPLICATIONS

This application is a continuation of U.S. patent application Ser. No. 15/791,944, filed on Oct. 24, 2017, now pending, the disclosure of which is hereby incorporated by reference.

BACKGROUND OF THE INVENTION

Technical Field of the Invention

The present invention relates generally to barriers (such as railings or fences) and in particular to a device that facilitates construction of a barrier.

Description of Related Art

A homeowner who would like to increase the height of an existing fence that includes steel poles generally has two options. The homeowner can remove his original height fence posts, usually six feet tall, from the ground. This typically involves digging into the ground to remove a fence post that has been anchored in concrete. Alternatively, the homeowner may use a fence post extender sleeve. The extender sleeve includes a pair of flared portions. One of the portion fits over an outer diameter of the existing fence post, and the second flared portion receives an outer diameter of an extension post. The sleeve may be secure to the post using a bracket that radially compresses the flared portions around the inserted post. The increased diameter of a portion of the fence post created by the sleeve may be undesirable because it may be unsightly and may hinder or prevent a post bracket from being slid in correct position up and down the post due to the increased outer diameter of the post sleeve.

SUMMARY

In an embodiment, a post coupler is laterally expandable. The post coupler includes a first member that is hollow and has a first slanted face. A second member is also hollow and has a second slanted face that is abutted with the first slanted face. A rod extends through the first and second members; the rod has a head that is disposed at a head end and threads disposed at a thread end. A nut is engaged with the threads, and rotating the nut causes the first member to extend in a first lateral direction and causes the second cylindrical member to extend in a second lateral direction opposite the first radial direction. In an embodiment, the post coupler is cylindrical and radially expandable in opposite radial directions.

According to one embodiment, the radially expanding post coupler is received in an open end of an existing fence post. The post coupler is radially expanded such that it impinges on an inner surface of the fence post, and a post extension is threaded onto the threaded rod of the post coupler.

According to an alternate embodiment, the radially expanding post coupler is post anchor. The post coupler is received in a borehole drilled in a wooden fence post. The post coupler is radially expanded to secure it within the borehole. The threaded rod is then received in a threaded bore of a base member to secure the post to the base member and anchor the post.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION

Figure 1:
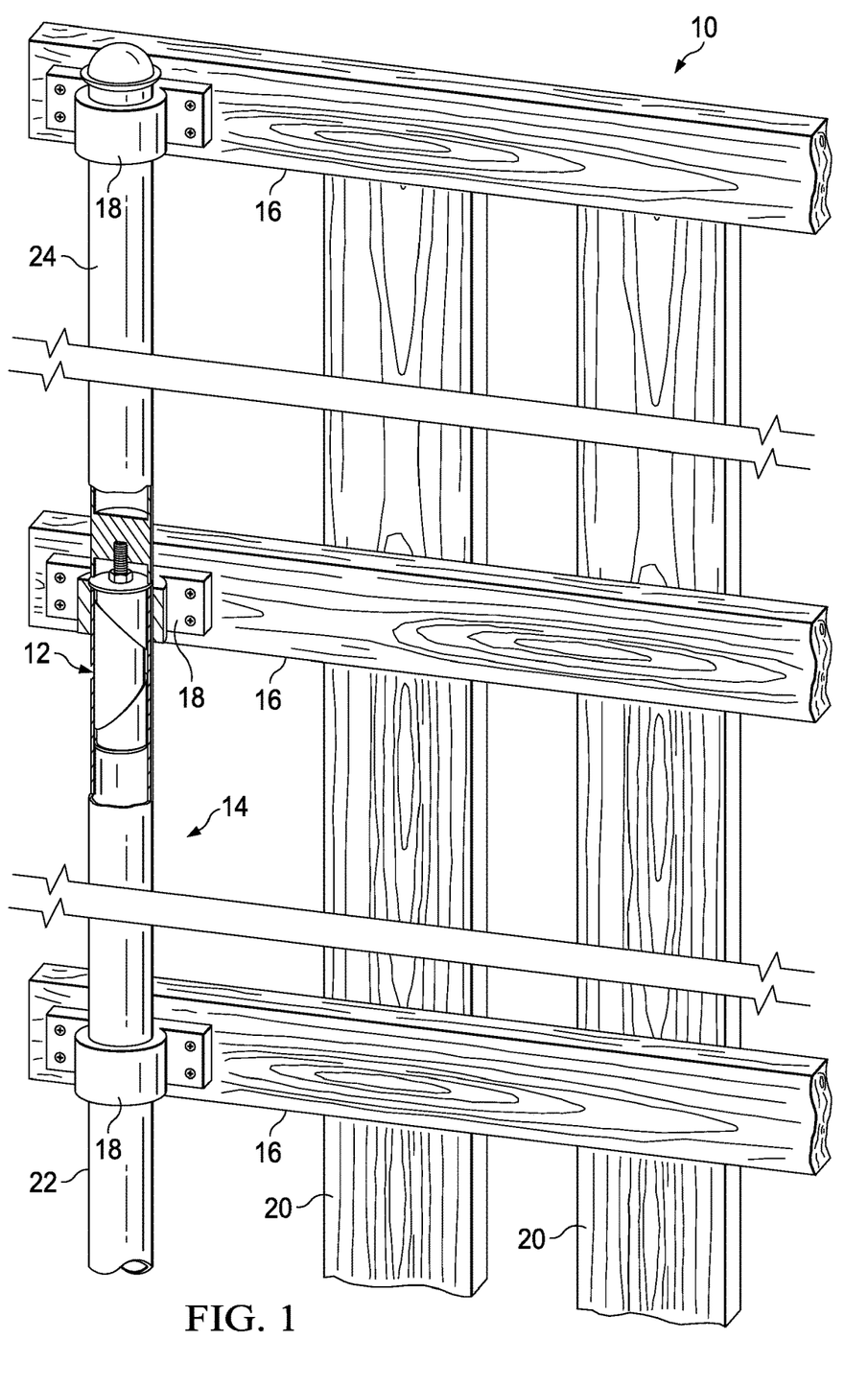
FIG. 1 is a perspective view with portions broken away of a fence panel including a radially expanding post extender according to the teachings of the present disclosure.

Reference is now made to FIG. 1 which illustrates a perspective view of a portion of a fence panel 10. The fence panel 10 includes radially expanding post extenders 12, also referred to herein as radially expandable post couplers, according to the teachings of the present disclosure. The radially expanding post extenders 12 allow the height of fence posts and a fence to be easily increased while keeping the radially expanding post extenders 12 hidden, which results in a more pleasing appearance of an extended fence panel 10.

The original fence may have been installed by a homeowner to have a height of approximately six feet. The homeowner may have a desire or a need for a taller fence, for example eight or nine feet, and the original steel cylindrical fence posts are still usable but just not tall enough. The homeowner can use the radially expanding post extenders 12 to increase the height of each fence post to increase the height of his fence up to three additional feet, which may be suitable to enclose a pool or may be desirable to increase the privacy of a backyard.

The fence panel 10 includes a pair of fence posts 14 (only one shown) that are disposed at each end of the fence panel 10. The fence posts 14 extend vertically. According to certain embodiments, the fence posts 14 are coupled to a post anchor (not shown). The post anchor may include a plurality of fins that taper to a point as shown and described in U.S. Pat. No. 7,730,675, entitled "Post Anchor with Post Holding Impressions," by Ian Hill, which is incorporated herein by reference.

The fence posts 14 support horizontal support members 16 that extend from one fence post 14 to the other fence post 14 disposed at the opposite side of the fence panel 10. The horizontal support members 16 are disposed spaced apart vertically along the fence posts 14. According to certain embodiment, brackets 18 secure the horizontal support members 16 to the fence posts 14. An example of a bracket 18 is shown and describe in U.S. Pat. No. 9,115,506, entitled "Wood to Pipe Bracket and a Connection Utilizing Such a Bracket," which is hereby incorporated by reference.

Because the radially expandable post coupler 12 is primarily disposed inside the hollow post and an outer diameter of an upper washer 26 is generally flush with the outer diameter of the fence post 14, the bracket 18 may be easily received over the top end of the fence post, and then slid to the appropriate position on the fence post 14 including over the junction of a post extension 24 to an existing fence post 22 and secured in place. When conventional post extension sleeves are used, the bracket 18 may not slide smoothly over an increased outer diameter portion of the coupler sleeve.

The horizontal support members 16 support a plurality of slats 20. Each slat 20 runs vertically, and collectively the slats create the barrier of the fence panel 10. The horizontal support members 16 and the slats 20 are generally formed of wood, but in certain embodiments may be formed of metal such as steel or aluminum. The slats 20 are fastened to the horizontal support members 16 using any suitable fasteners, such as nails, screws, bolts, and the like.

The radially expanding post extender 12 is disposed in a top portion of each of the original height fence posts 22, as described in more detail below. The post extender 12 allows a post extension 24 to be coupled to the original height fence post 22, which allows the height of the fence panel 10 to be increased. The extended height fence post 14 supports additional horizontal support members 16, which support longer slats 20. The radially expanding post extender 12 is a considerable improvement over conventional increased height fences because the original height fence post does not need to be removed and replaced with a higher fence post in order to increase an overall height of a fence. As stated above, the anchor of the original height fence post may have been secured in the ground with cement or concrete, so avoiding removal of the anchor from the ground significantly simplifies and reduces the effort required to increase the height of the fence. Also, the radially expandable post extender 12 is concealed within the hollow cavity of the fence post 14, and therefore blends seamlessly into the fence post 14.

Figure 2:
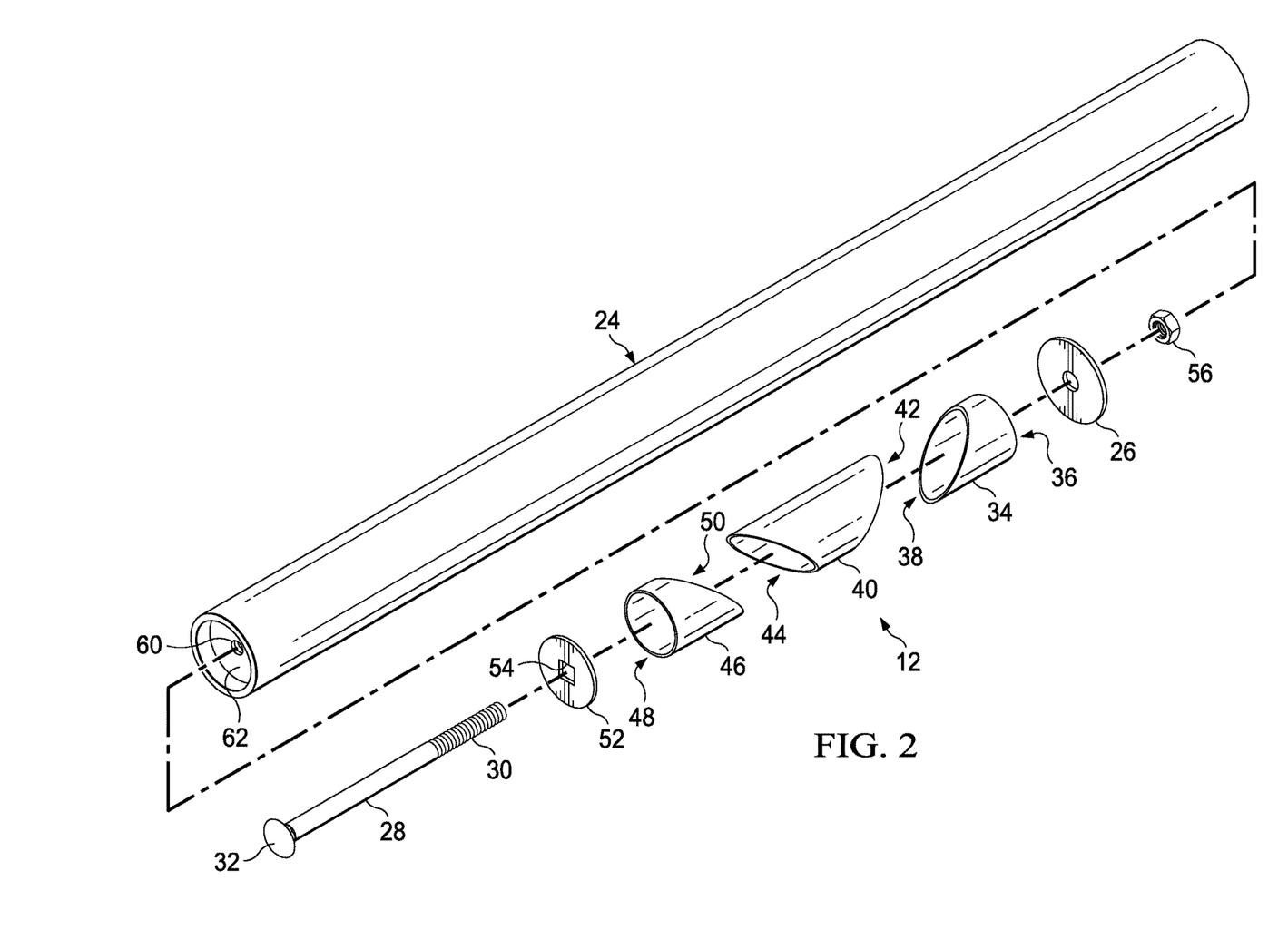
FIG. 2 is an exploded, perspective view of a the radially expanding post extender and post extension shown in FIG. 1.

FIG. 2 is an exploded, perspective view of the radially expanding post extender 12 and the post extension 24 shown in FIG. 1. As shown in FIG. 1, the radially expanding post extender 12 is inserted into an existing hollow post 22. The upper washer 26 has an outer diameter equal to or greater than a diameter of the existing fence post 22. The upper washer 26 contacts the upper end face 27 of the existing fence post 22 (see FIG. 3) and ensures that the radially expanding post extender 12 remains disposed at an upper end of the existing fence post 22 upon initial insertion. A rod 28 extends through the radially expanding post extender 12. The rod 28 includes threads 30 disposed at least at a threaded end of the rod 28. A head 32 is disposed at a head end of the rod 28 opposite the threaded end.

Three hollow cylindrical members are disposed to surround the rod 28 and are allowed to float axially and radially on the rod 28. An upper cylindrical member 34 is hollow and is disposed proximate the upper washer 26. The upper cylindrical member 34 includes an upper abutment face 36 and a slanted abutment face 38. The slanted abutment face 38 may be slanted at an angle in a range of 20°-70°, for example 45°. An intermediate cylindrical member 40 is also hollow and disposed axially below the upper cylindrical member 34. An upper slanted abutment face 42 abuts the lower slanted abutment face 38 of the upper cylindrical member 34. A lower slanted abutment face 44 abuts a lower cylindrical member 46. The lower cylindrical member 46 is disposed axially below the intermediate cylindrical member 40. Similar to the upper cylindrical member 34, the lower cylindrical member 46 includes a lower abutment face 48 and a slanted abutment face 50 that abuts the lower slanted abutment face 44 of the intermediate cylindrical member 40. The lower abutment face 48 contacts a lower washer 52. The lower washer 52 includes a through hole 54 through which the rod 28 extends. The through hole 54 is sized to be smaller than the head 32. According to certain embodiments, the through hole 54 has a diameter that is less than the diameter of the head 32. According to an alternate embodiment, the rod 28 may be a carriage bolt. The through hole 54 in the lower washer 52 may be square to correspond to a shape of a neck portion of the rod 28 disposed at the junction of the head 32 with the body of the rod 28. Engagement of the square rod neck with the square-shaped through hole 54 prevents the rod 28 from spinning during assembly.

Figure 3:
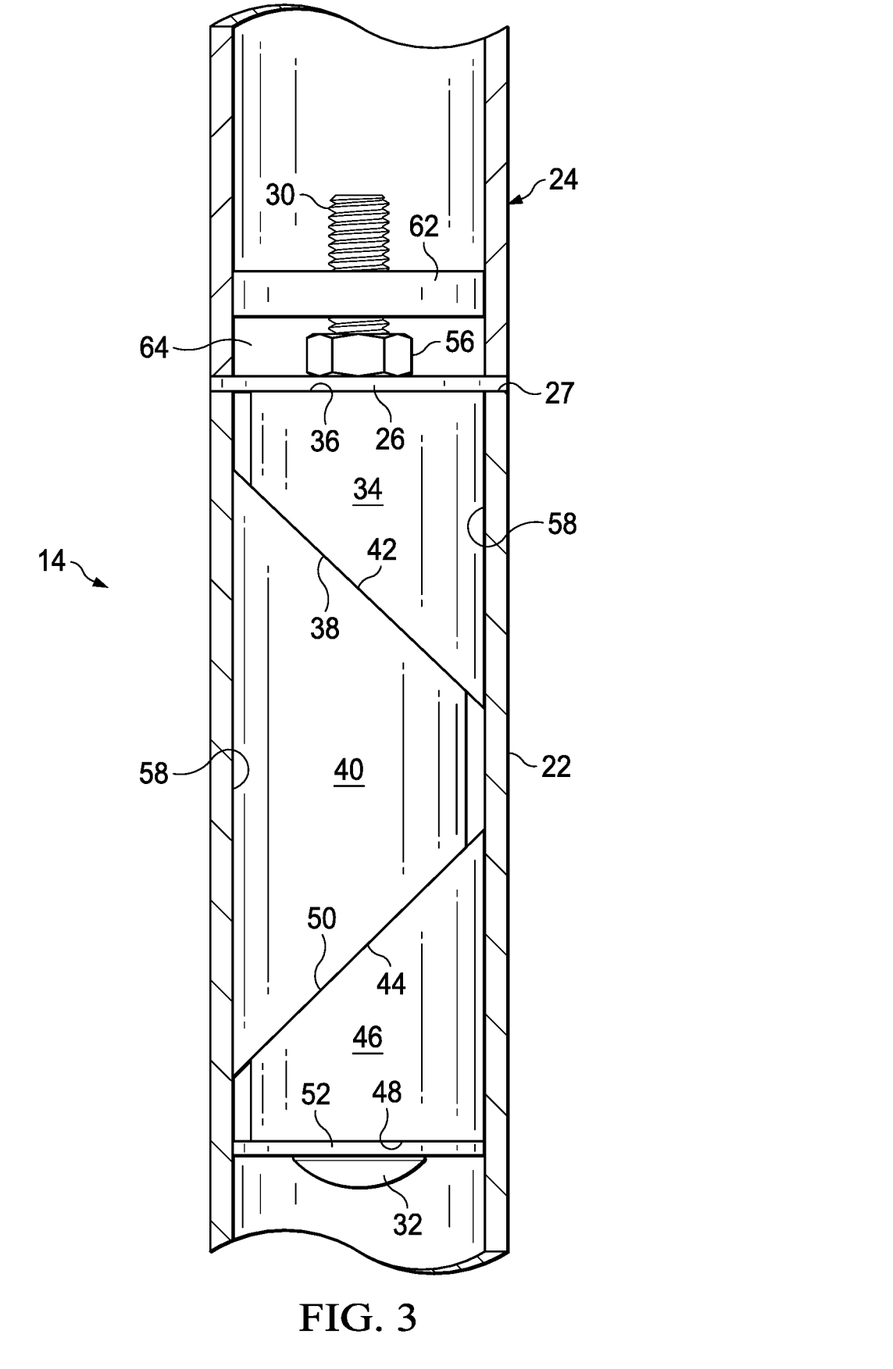
FIG. 3 is an elevation view with portions in cross-section of the radially expanding post extender engaged with a post extension according to the teachings of the present disclosure.

FIG. 3 is a detailed view of the cross-section shown in FIG. 1 with the bracket 18 removed for clarity. After inserting the radially expanding post extender 12 into the existing fence post 22, a nut 56 is rotated on the threads 30 of the rod 28. Rotating the nut 56 draws the head 32 of the rod 28 towards the nut 56. The head 32 directs the lower washer 52 upward toward the nut 56, and the lower washer 52 directs the lower cylindrical member 46 upward toward the nut 56. The upward movement of the lower cylindrical member 46 acts to cause the intermediate cylindrical member 40 to slide radially outward on its upper and lower slanted faces 42, 44. In turn, the upper and lower cylindrical members 34, 46 slide radially outward along their respective slanted abutment faces 38, 50. The slanted abutment faces 42, 44 cause the intermediate cylindrical member 40 to extend in a first direction radially outward and cause the upper and lower cylindrical members 34, 46 to extend in a second direction opposite the first direction radially outward. The radial expansion of the intermediate cylindrical member 40 and the upper and lower cylindrical members 34, 46 impinge on an inner surface 58 of the existing fence post 22. This impingement increases the frictional force between the cylindrical members 34, 40, 46 and the inner surface 58 of the existing fence post 22. Thus, the radially expandable coupler 12 is tightly engaged with the exiting fence post 22 because the shear force required to displace the radially expandable coupler 12 is increased as the nut 56 is turned and the radially expandable coupler 12 is radially expanded.

A portion of the threaded rod 28 extends beyond the nut 56. This portion is received by a threaded hole 60 formed in an insert 62 that is coupled to the extension post 24. According to certain embodiments, the insert 62 may be welded or otherwise secured within the opening of the post extension 24. The post extension 24 is rotated to engage the threaded hole 60 with the threads 30 of the rod 28. Because the radially expandable coupler 12 is tightly secured against displacement within the existing post 22, as described above, the post extension 24 can be rotated against the stationary threaded rod 28 to thereby secure the post extension 24 to the radially expandable coupler 12. The upper washer 26 is disposed axially between the existing fence post 22 and the post extension 24. The nut 56 is concealed in a gap 64 formed between the insert 62 and the upper washer 26.

Each of the upper and lower washers 26, 52 and the upper, lower, and intermediate cylindrical members 34, 40, 46 are formed of any suitable material, such as galvanized steel of any suitable gauge, such as thirteen or sixteen gauge. The upper washer 26 may have an outer diameter that allows it to be flush with the outer diameter of the existing fence post 22 and the post extension 24. According to certain embodiments, standard steel fence posts have an outer diameter of 2.375 inches. Therefore, the outer diameter of the upper washer 26 may be approximately 2.375 inches. However, any suitable diameter is contemplated by this disclosure. An outer diameter of the lower washer 52, the upper cylindrical member 34, the lower cylindrical member 46, and the intermediate cylindrical member 40 is less than the inner diameter of the existing fence post 22. According to certain embodiments, the outer diameter of the lower washer 52, the upper cylindrical member 34, the lower cylindrical member 46, and the intermediate cylindrical member 40 is approximately 1.875 inches; however any suitable outer diameter is contemplated by this disclosure.

The post extension 24 is about 36 inches in length. An installer may cut this length to any desired shorter length, such as two feet to extend a six foot fence to an eight foot fence.

According to an alternate embodiment, the radially expandable post extender 12 may be used to couple a post with a larger or smaller diameter than the diameter of the existing post. For example, a property owner may want to replace a chain link fence with a privacy fence. The property owner may cut the fence posts of the chain link fence near the ground. A radially expandable post coupler 12 is inserted into the fence post portion remaining after the cut. The radially expandable post coupler 12 is sized to be received in a chain link fence post, which typically has an outer diameter of 1.875 inches and may be formed of sixteen gauge galvanized steel. The post coupler 12 is expanded to secure it into the interior of the fence post. And then a larger diameter post extension, for example a post extension with an outer diameter of 2.375 inches may be threaded to the threaded rod 28 of the radially expanding post coupler 12. This disclosure contemplates sizing the components to extend tubes of all sizes and diameters, regardless whether the joined tubes have the same diameter.

According to a further alternate embodiment, the radially expanding post coupler 12 may be received, expanded, and secured in a hole that has been drilled in a solid foundation, such as a concrete or cement foundation. In this manner, a post extension may be made without an existing post. Such employment of the radially expanding post coupler may be particularly useful in erection of hand railings, sign posts, and the like.

Figure 4:
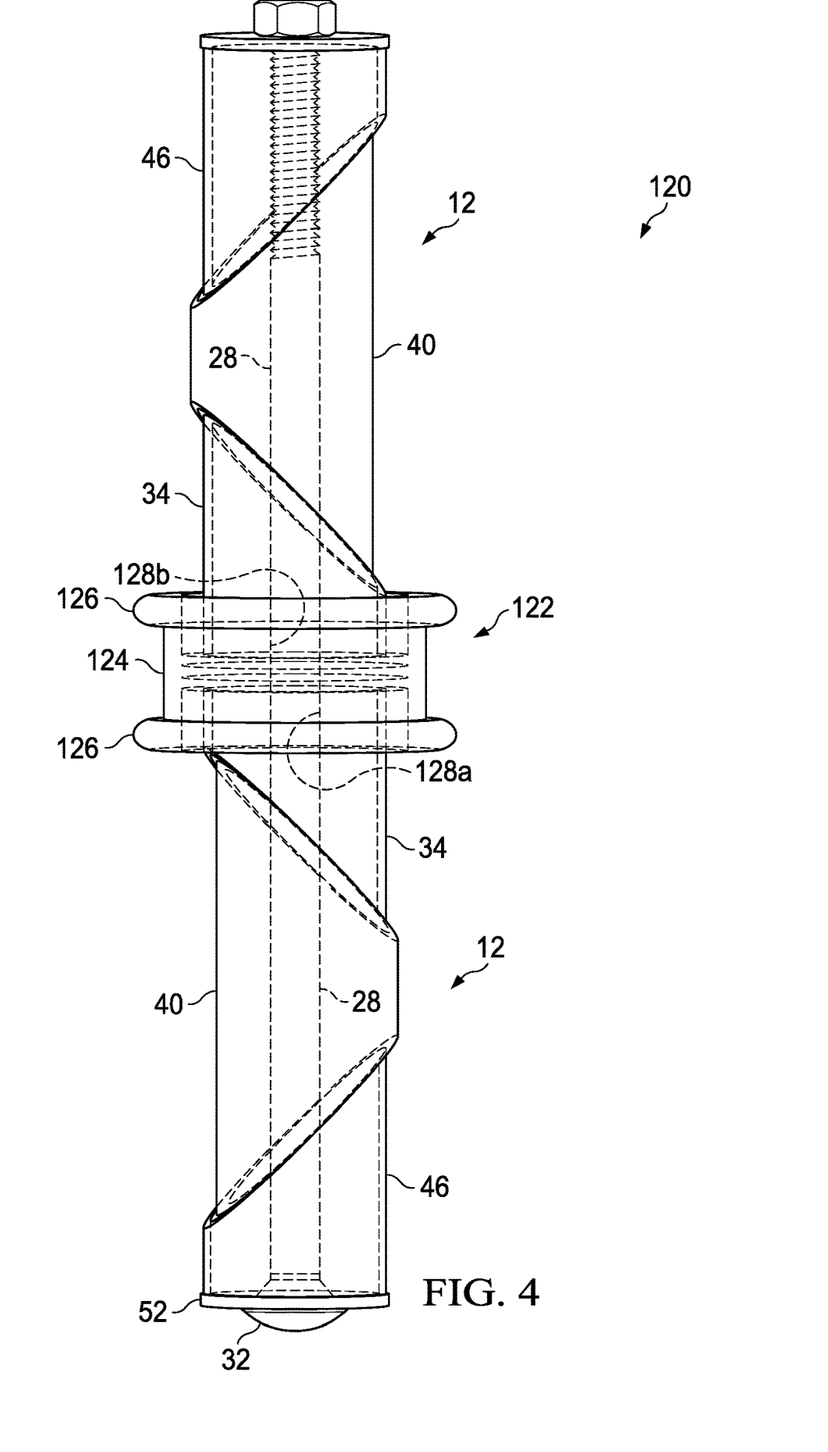
FIG. 4 is an isometric view of an alternate embodiment of a post extension system employing dual radially expandable couplers.

Reference is made to FIG. 4, which is an isometric view of an alternate embodiment of a post/tube extension system 120 according to the teachings of the present disclosure. The system 120 includes a pair of radially expandable couplers 12 coupled together by a coupler 122.

The coupler 122 is generally cylindrical and includes a body 124 and a pair of rims 126 disposed opposite the body 124 of each other. The coupler 122 includes a first threaded bore 128a and a second threaded bore 128b that is coaxial with the first threaded bore 128a. One of the radially expandable couplers 12 may be inserted into a hollow cylindrical member, such as a fence post. The radially expandable coupler 12 is expanded to secure it within the hollow cylindrical member, as described above. A second radially expandable coupler 12 is inserted into a second hollow cylindrical member, such as a fence post extension, and it is radially expanded to secure it to the interior of the second hollow cylindrical member. The threaded portion of the threaded rods 28 of each radially expandable coupler 12 is received in threaded engagement with a respective threaded bore 128a, 128b of the coupler 122. In this manner, the two hollow cylindrical members can be joined together with the coupler 122 disposed between the hollow cylindrical members. Joining hollow cylindrical members according to the system 120 allows any hollow cylindrical members to be joined, not just those where an insert has been welded or otherwise secured to an extension post. Thus, the installer may couple together a variety of sizes of hollow cylindrical members.

Figure 5:
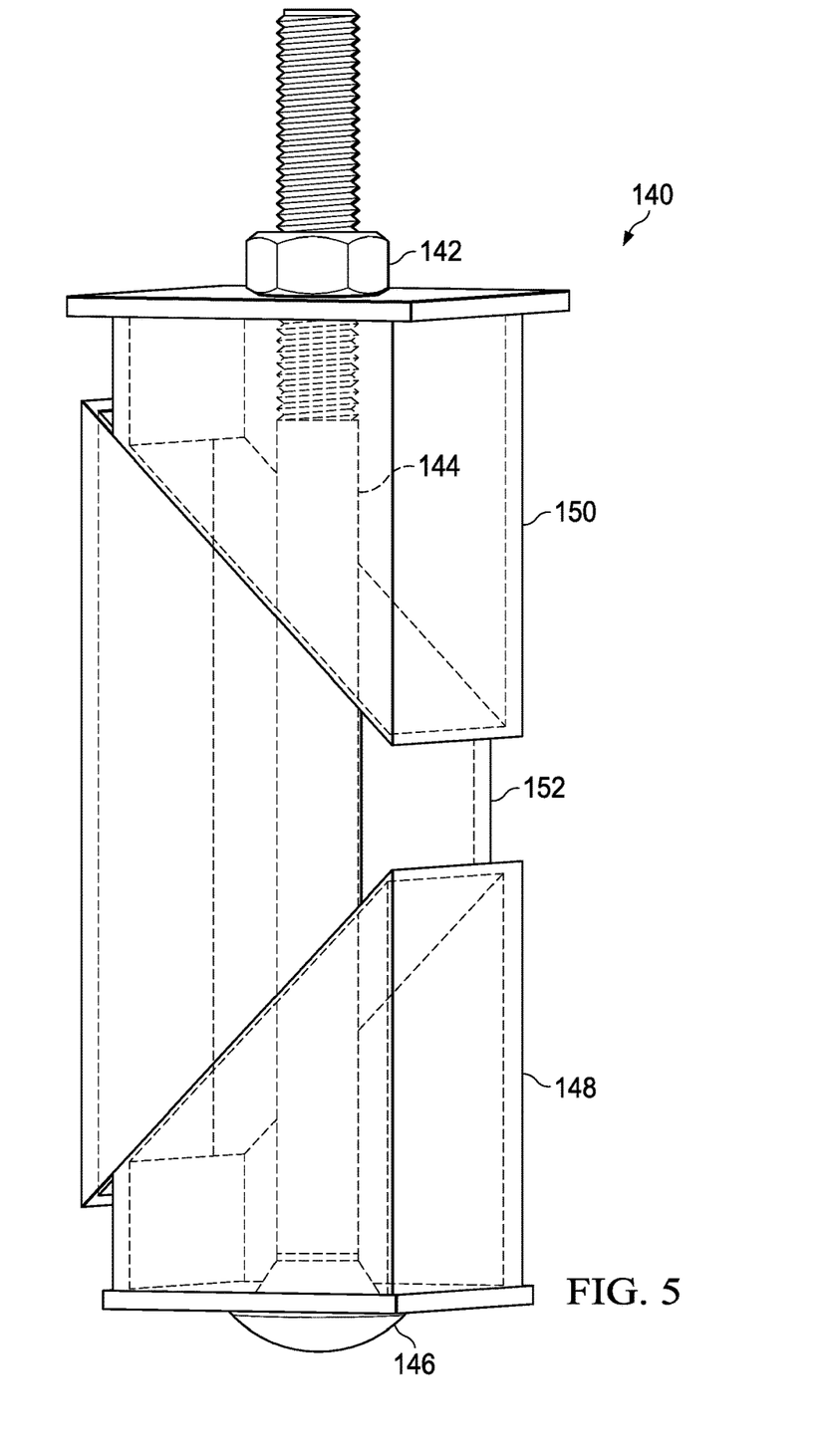
FIG. 5 is an isometric view of an alternate embodiment of an expandable coupler having a non-circular cross section.

FIG. 5 illustrates an alternative embodiment of an expandable coupler 140 according to the teachings of the present disclosure. The expandable coupler 140 is non-circular in cross section. For example, the expandable coupler 140 is rectangular or square in cross section. The expandable coupler 140 may be particularly useful in extending a length of a fence post that is hollow and has a rectangular or square cross section. The expandable coupler 140 functions similar to the radially expandable coupler 12. The installer inserts the expandable coupler 140 into an end of a hollow member with a square or rectangular cross section. The nut 142 is rotated on the threaded rod 144 to draw the rod head 146 toward the nut 142. The slanted abutment faces of the lower hollow member 148 and the upper hollow member 150 slide on respective slanted abutment faces of an intermediate hollow member 152. The upper and lower hollow members 148, 150 are displaced in a first lateral direction, and the intermediate hollow member is displaced in a second lateral direction opposite the first direction. This displacement secures the expandable coupler 140 within the hollow member. The exposed portion of the threaded rod 144 is received in a threaded bore of an insert, as described above with respect to FIG. 2, or in an alternate embodiment, the exposed portion of the threaded rod 144 is received in a threaded bore of a coupler, as described above with respect to FIG. 4.

Figure 6:
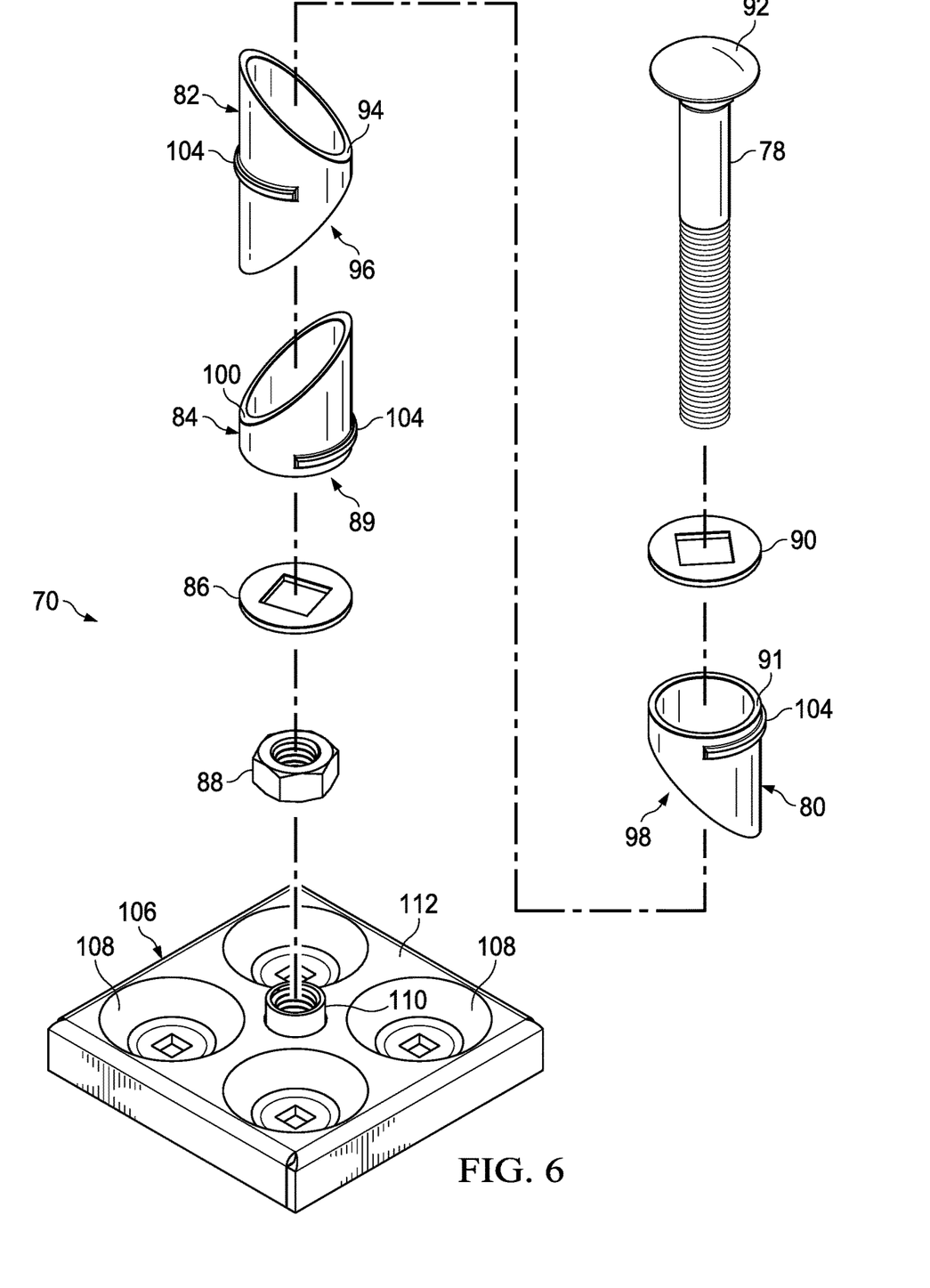
FIG. 6 is an exploded, perspective view of a radially expanding post anchor according to the teachings of the present disclosure.
Figure 7:
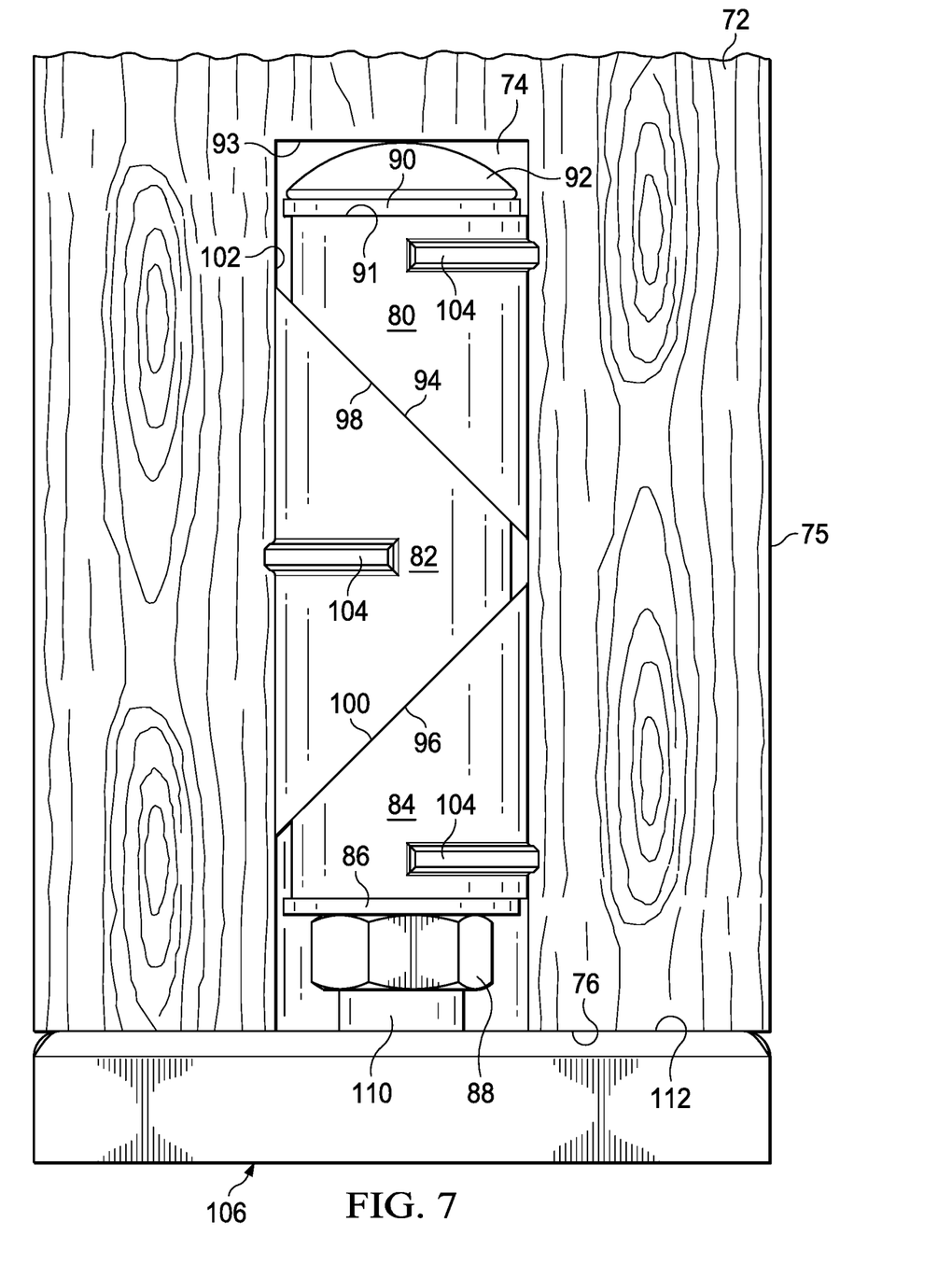
FIG. 7 is an elevation view of the radially expanding post anchor of FIG. 4 shown engaged in a borehole formed in a center of a wooden post.

FIG. 6 is an exploded view of a radially expanding post anchor 70. FIG. 7 illustrates the radially expanding post anchor 70 disposed inside a borehole 74 in a wooden post 72. The post 72 may have a square-shaped cross section, but other cross-section shapes are possible. As shown in FIG. 7, the borehole 74 is drilled into a bottom surface 76 of the post 72, and the radially expandable post anchor 70 is inserted into the hole 74. The borehole 74 is drilled or otherwise formed at a center of the bottom surface 76. The post 72 is secured to a base member 106 such that the outer surface 75 of the post is generally aligned with the perimeter of the base member 106.

Similar to the radially expandable post extender 12 described above, a threaded rod 78 extends through an upper cylindrical member 80, an intermediate cylindrical member 82 and a lower cylindrical member 84, where each is hollow and surrounds the threaded rod 78 such that they are allowed to float radially. A lower washer 86 is disposed axially between a nut and 88 and a square abutment face 89 of the lower cylindrical member 84. An upper washer 90 is disposed axially between a head 92 and a square abutment face 91 of the upper cylindrical member 80. According to some embodiments, the upper washer 90 may be omitted and the head 92 may act directly on the upper cylindrical member 80.

The radially expanding post anchor 70 is received within the borehole 74. According to certain embodiments, the head 92 of the rod 78 contacts a floor surface 93 of the borehole 74. Tightening the nut 88 displaces the lower washer 86 and the lower cylindrical member 84 toward the head 92 of the rod 78. The movement of the lower cylindrical member 84 acts to cause the intermediate cylindrical member 82 to slide radially outward on its upper and lower slanted faces 94, 96. In turn, the upper and lower cylindrical members 80, 84 slide radially outward along their respective slanted abutment faces 98, 100. The intermediate cylindrical member 82 extends in a first direction radially outward, and the upper and lower cylindrical members 80, 84 extend radially outward in a second direction opposite the first direction. The radial expansion of the intermediate cylindrical member 82 and the upper and lower cylindrical members 80, 84 impinge on an inner surface 102 of the borehole 74 of the post 72. A protrusion 104 extends from each of the upper, lower, and intermediate cylindrical members 80, 82, 84. The protrusion 104 is configured to dig into the wood as the post anchor 70 expands radially. The engagement of the protrusion 104 and the wood secures the post anchor 70 against displacement. Thus, the radially expandable post anchor 70 is tightly engaged with the post 72 because the shear force required to displace the radially expandable post anchor 70 is increased as the nut 88 is turned and the radially expandable post anchor 70 is radially expanded.

According to an alternate embodiment, the intermediate cylindrical member 82 may be omitted, and the upper cylindrical member 80 extends radially in one direction and the lower cylindrical member 84 extends in the opposite radial direction.

A base member 106 is secured using a plurality of fasteners (not shown) that extend through each of a plurality of countersunk through holes 108 in the base member 106. For example, the base member 106 may have four through holes 108, which each receive a screw through the through hole 106 and into a deck surface. The deck surface may be metal, wood, or concrete.

The base member 106 includes a threaded bore formed in a protrusion 110 extending from a center of the base member 106. The threaded bore is configured to receive the threads of the threaded rod 78 after the post anchor 70 has been tightly secured within the borehole 74, as described above. Rotation of the fence post 72 engages the threads of the rod 78 with the threaded bore of the protrusion 110 of the base member 106. The fence post 72 is rotated until the bottom surface 76 of the fence post 72 abuts an upper surface 112 of the base member 106. The post anchor 70 is secured against displacement and slippage by the protrusions 104 that are wedged in the depressions that are formed in the wood of the post 72.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A post coupler system, comprising:
   a first member having an abutment face at one end and a first slanted face at an opposite end and that is slanted relative to the abutment face;
   a second member having a second slanted face configured to abut with the first slanted face, the first and second member being composed of a rigid material;
   a rod extending through the first and second members, the first member and the second member being laterally movable with respect to the rod, the rod having a head disposed at a head end and threads disposed at a thread end; and
   a nut engaged with the threads at the thread end, wherein rotating the nut displaces the first member axially toward the second member and the first slanted face of the first member directs lateral displacement of the second member, and the second slanted face of the second member directs lateral displacement of the first member, the lateral displacement of the first and second members operable to engage an inner surface of a hollow member, and wherein the threads extend beyond the nut; and
   a first washer disposed axially between the nut and the second member and being sized to engage an end face of the hollow member, wherein the first washer extends perpendicular to the rod for engaging the abutment face of the first member, wherein the abutment face runs perpendicular to the rod;
   wherein the first member and the second member are engaged within a fence post, and the thread end of the rod is engaged in a threaded insert of an extension post.

2. The post coupler system of claim 1 further comprising a second washer disposed axially between the head and the first member.

3. The post coupler system of claim 1 wherein the first and second members have a rectangular or square cross section.

4. The post coupler system of claim 1 wherein the first and second members are cylindrical.

5. The post coupler system of claim 1 wherein the first and second members are generally hollow and float on the rod when not engaged to the inner surface of the hollow member.

6. A post coupler, comprising:
   a first member having a first slanted face;
   a second member having a second slanted face configured to abut with the first slanted face, the first and second member being composed of a rigid material;
   a rod extending through the first and second members, the first member and the second member being laterally movable with respect to the rod, the rod having a head disposed at a head end and threads disposed at a thread end; and
   a nut engaged with the threads at the thread end, wherein rotating the nut displaces the first member axially toward the second member and the first slanted face of the first member directs lateral displacement of the second member, and the second slanted face of the second member directs lateral displacement of the first member, the lateral displacement of the first and second members operable to engage an inner surface of a hollow member, and wherein the threads extend beyond the nut and are configured to be received in a threaded bore;
   a first washer disposed axially between the nut and the second member and being sized to engage an end face of the hollow member, wherein the first washer extends perpendicular to the rod for engaging an abutment face of one of the first member or the second member; and
   a second washer disposed proximate the head of the rod and a neck disposed at the head end of the rod having a square-shaped cross section corresponding to a square shaped through hole in the second washer.

7. A post coupler, comprising:
   a first member having a first slanted face;
   a second member having a second slanted face configured to abut with the first slanted face, the first and second member being composed of a rigid material;
   a rod extending through the first and second members, the first member and the second member being laterally movable with respect to the rod, the rod having a head disposed at a head end and threads disposed at a thread end; and a nut engaged with the threads at the thread end, wherein rotating the nut displaces the first member axially toward the second member and the first slanted face of the first member directs lateral displacement of the second member, and the second slanted face of the second member directs lateral displacement of the first member, the lateral displacement of the first and second members operable to engage an inner surface of a hollow member, and wherein the threads extend beyond the nut and are configured to be received in a threaded bore;

a first washer disposed axially between the nut and the second member and being sized to engage an end face of the hollow member; and a post extension having an insert disposed at an end of the post extension, the insert defining the threaded bore.

8. A post coupler, comprising:

a first member having a first slanted abutment face;

a second member having a second slanted abutment face;

a third member disposed axially between the first and second members and having a third slanted abutment face configured to abut with the first slanted abutment face and a fourth slanted abutment face configured to abut with the second slanted abutment face;

a rod extending through the first, second, and third members and having a head disposed at a head end and threads disposed at a thread end, at least the third member being laterally movable with respect to the rod; and a nut disposed at the thread end and engaged with the threads, wherein tightening the nut draws the first member toward the third member and the first and second slanted abutment faces direct the third member to displace laterally, at least the third member being configured to engage an inner surface of a hollow member, wherein the threads extend beyond the nut and are configured to be received in a threaded bore; and a post extension having an insert disposed at an end of the post extension, the insert defining the threaded bore.

9. The post coupler of claim 8 wherein each of the first, second, and third members are hollow.

10. The post coupler of claim 8 wherein the first, second, and third members are circular in cross section.

11. The post coupler of claim 8 wherein the first, second, and third members are rectangular or square in cross section.

12. The post coupler of claim 8 wherein the first, second, and third members float on the rod when not engaged with the inner surface of the hollow member.

13. The post coupler of claim 8 wherein a first washer is disposed at the thread end of the rod between the nut and the second member and a second washer is disposed at the head end of the rod axially between the head and the first member.

14. The post coupler of claim 8 further comprising a post base member, the post base member defining the threaded bore disposed proximate a center of the post base member.

15. The post coupler of claim 8 wherein the threaded bore is a first threaded bore and further comprising a coupling member defining the first threaded bore and a second threaded bore disposed coaxial with the first threaded bore.

16. A post coupler system, comprising:

a first member having a first slanted abutment face at one end and an abutment face at an opposite end, wherein the first slanted abutment face is slanted relative to the abutment face;

a second member having a second slanted abutment face;

a third member disposed axially between the first and second members and having a third slanted abutment face configured to abut with the first slanted abutment face and a fourth slanted abutment face configured to abut with the second slanted abutment face;

a rod extending through the first, second, and third members and having a head disposed at a head end and threads disposed at a thread end, the first, second, and third members being laterally movable with respect to the rod; and a nut disposed at the thread end and engaged with the threads, wherein tightening the nut draws the first member toward the third member and the third slanted abutment face directs the first member to displace laterally and the second slanted abutment face directs the third member to displace laterally, wherein lateral displacement of the first and third members is operable to engage an inner surface of a hollow member, and wherein a portion of the thread end extends beyond the nut; and a first washer disposed axially between the nut and the second member and being sized to engage an end face of the hollow member, wherein the first washer extends perpendicular to the rod for engaging an abutment face of the first member, wherein the abutment face of the first member runs perpendicular to the rod;

wherein the first member, the second member and the third member are engaged within a fence post, and the thread end of the rod is engaged in a threaded insert of an extension post.

17. The post coupler system of claim 16 wherein the first, second, and third members are circular in cross section.

18. The post coupler system of claim 16 wherein the first, second, and third members are rectangular or square in cross section.

19. The post coupler system of claim 16 wherein the first, second, and third members float on the rod when not engaged with the inner surface of the hollow member.

20. The post coupler system of claim 16 further comprising a post base member, the post base member defining the threaded bore disposed proximate a center of the post base member.

21. The post coupler system of claim 16 wherein the threaded bore is a first threaded bore and further comprising a coupling member defining the first threaded bore and a second threaded bore disposed coaxial with the first threaded bore.

22. A post coupler, comprising:

a first member having a first slanted abutment face;

a second member having a second slanted abutment face;

a third member disposed axially between the first and second members and having a third slanted abutment face configured to abut with the first slanted abutment face and a fourth slanted abutment face configured to abut with the second slanted abutment face;

a rod extending through the first, second, and third members and having a head disposed at a head end and threads disposed at a thread end, the first, second, and third members being laterally movable with respect to the rod; and a nut disposed at the thread end and engaged with the threads, wherein tightening the nut draws the first member toward the third member and the third slanted abutment face directs the first member to displace laterally and the second slanted abutment face directs the third member to displace laterally, wherein lateral displacement of the first and third members is operable to engage an inner surface of a hollow member, and wherein a portion of the thread end extends beyond the nut and is configured to be received in a threaded bore;

a first washer disposed axially between the nut and the second member and being sized to engage an end face of the hollow member; and a post extension having an insert disposed at an end of the post extension, the insert defining the threaded bore.

\* \* \* \* \*